United States Patent

[11] 3,607,266

[72] Inventors Yoshikazu Yamada
Sierra Madre;
Thomas H. Garland, El Monte, both of Calif.

[21] Appl. No. 631,502
[22] Filed Apr. 17, 1967
[45] Patented Sept. 21, 1971
[73] Assignee Bell & Howell Company
Chicago, Ill.
Continuation-in-part of application Ser. No. 523,705, Jan. 28, 1966, now Patent No. 3,503,745, which is a continuation-in-part of application Ser. No. 481,759, Aug. 23, 1965, now Patent No. 3,476,562, which is a continuation-in-part of application Ser. No. 352,625, Mar. 17, 1964, now abandoned , which is a continuation-in-part of application Ser. No. 278,050, May 6, 1963, now abandoned.

[54] IMAGE INTENSIFICATION PROCESS FOR SENSITIZED FILM
15 Claims, 3 Drawing Figs.

[52] U.S. Cl. 96/27, 96/48, 96/90, 96/89, 96/119, 96/106
[51] Int. Cl. G03c 5/04, G03c 5/24
[50] Field of Search 96/90, 89, 48, 106, 10, 27

[56] References Cited

UNITED STATES PATENTS

| | | | |
|---|---|---|---|
| 3,510,300 | 5/1970 | Fotland et al. | 96/48 |
| 3,042,517 | 7/1962 | Wainer | 96/90 X |
| 3,095,303 | 6/1963 | Sprague | 96/36.3 |
| 3,099,558 | 7/1963 | Levinos | 96/36.3 |
| 3,189,456 | 6/1965 | Hunt | 96/106 |

*Primary Examiner*—Norman G. Torchin
*Assistant Examiner*—Richard E. Fichter
*Attorney*—Nilsson, Robbins, Wills & Berliner ABSTRACT: Methods for increasing the effective speed of photosensitive compositions and compositions modified to be sensitive to light levels lower than ordinarily useful for inducing a developable latent image. Such image is induced and is intensified upon exposure to radiation in a spectral region to which the unmodified composition has comparably low sensitivity.

YOSHIKAZU YAMADA
THOMAS H. GARLAND
INVENTORS

BY

ATTORNEY.

IMAGE INTENSIFICATION PROCESS FOR SENSITIZED FILM

CROSS-REFERENCE TO RELATED APPLICATIONS

This application is a continuation-in-part of application Ser. No. 523,705, filed Jan. 28, 1966, entitled "Dye Sensitization," now U.S. Pat. No. 3,503,745, which in turn is a continuation-in-part of application Ser. No. 481,759, filed Aug. 23, 1965, entitled "Production and Use of Photosensitive Compositions and Films," now U.S. Pat. No. 3,476,562, which in turn is a continuation-in-part of application Ser. No. 352,625, filed Mar. 17, 1964, entitled "Dye Sensitization of Photosensitive Materials," now abandoned, which in turn is a continuation-in-part of application Ser. No. 278,050, filed May 6, 1963, entitled "Production and Use of Photosensitive Compositions and Films," now abandoned. Other related disclosure is contained in an application Ser. No. 631,141 by P. Bruck and N. G. Adin, entitled "Improved Sensitizers," filed concurrently herewith.

BACKGROUND OF THE INVENTION

1. Field of the Invention

The field of art to which the invention pertains includes the field of photographic chemistry, processes and materials, particularly processes involving developing and ancillary operations and compositions therefor, and light-sensitive compositions including those involving light-sensitive dyes and dye-formers.

2. Description of the Prior Art

Image-intensification methods for increasing film speed to develop out an image are known to the art. In the field of silver halide photochemistry, several procedures are available for latent image intensification (latensification). Thus, it is known to latensify by means of certain liquid baths, by gaseous treatment or by means of supplemental exposure, or by an assortment of various exposure combinations involving solarization and/or Herschel effects. For example, in U.S. Pat. No. 2,220,882 intensification of a silver halide latent image with infrared radiation is described. In U.S. Pat. No. 3,241,961 a silver halide emulsion is preexposed to uniform nonimage-forming radiation, imagewise exposed with ultraviolet light and then photodeveloped with relatively low intensity room light. U.S. Pats. Nos. 3,123,474, 3,183,088 and 3,241,971 also illustrate silver halide compositions that can be photodeveloped in such manner. In U.S. Pat. No. 3,152,902, a silver halide printout paper is exposed to form a latent image and then latensified with light substantially free of radiations to which the unexposed emulsion is sensitive. U.S. Pat. No. 2,857,273 illustrates a process involving the Herschel effect in which a latent image is progressively destroyed by exposure to intense red light.

In the field of organic photochemistry, not involving the use of a silver halide salt to obtain an image, fewer intensification effects have been noted. Even here, however, certain intensifiable systems have been demonstrated. For example, in U.S. Pat. No. 3,095,303 a photosensitive system is described comprising a styryl dye base, (4-(p-dimethylaminostyryl)-quinoline), in combination with an organic halogen compound, wherein imagewise exposure causes conversion of the dye base to the quaternary salt, a colored dye, to yield a negative-working image. In that system, without intensification, high levels of exposure are required to obtain an image. However, by means of light intensification, e.g., with red light, moderate levels of imaging light can be used. Such procedures involve color-forming materials, in this case the styryl dye bases which are themselves intensifiable. Other systems have been described using leuco crystal violet as the color-forming autointensifiable material; e.g., in U.S. Pat. No. 3,121,633 brief exposures to heat (or infrared) intensifies an exposed combination of leuco dye base and tribromoacetophenone. In still other systems, mixtures of leuco crystal violet and 4-(p-dimethylaminostyryl)quinoline act in concert and synergistically as dye base materials that are similarly intensifiable. Typical printout compositions containing such material are found in U.S. Pat. Nos. 3,102,029 and 3,102,810. It has also been found that such systems are quite specific and that intensification is obtained only with certain specific dye bases and combinations and when only specific solvents and binders are used and that in such systems complex interactions take place between the photochemicals and binders.

In the above systems, the intensifying radiation either has no color-forming effect on those areas of the film which were not previously exposed or else has a lesser effect than on such preexposed areas so that the intensification is sufficiently nonfogging to allow the production of a discernible image. Thus, it is known to intensify images obtained in photosensitive material where the photosensitive material itself yields an image that can be intensified. However, there are many photosensitive systems in which the imagewise exposed color-forming material does not sufficiently intensify to form a useful image. With organic systems, generally two or more organic materials are involved, other than merely dye bases, which react under the influence of actinic light to produce a color. As early as 1921, Murray C. Beebe and his coworkers described numerous organic photographic systems (e.g., U.S. Pat. Nos. 1,574,357; 1,574,358; 1,574,359; 1,575,143; 1,583,519; 1,587,269; 1,587,270; 1,587,271; 1,587,272; 1,587,273; 1,587,274; 1,604,674; 1,618,505; 1,655,127; 1,658,510; and 1,820,593). Generally, these systems relate to the use of organic halogen compounds (e.g., iodoform and others) in combination with a second material, in which Beebe and subsequent workers have theorized that light effects the release of a radical from the halogen compound which carries out a color-forming reaction with the second material. Subsequent workers such as Eugene Wainer (e.g., U.S. Pat. Nos. 3,042,515; 3,042,516; 3,042,517; 3,042,518; 3,042,519; 3,046,125; and 3,056,673) and Robert Sprague (U.S. Pat. No. 3,082,086), as well as a number of other workers since the time of Beebe, have continued the development of various photographic systems involving photoenergized reactions of combinations of halogen-containing compounds and one or more other compounds. Other recent disclosures include British Pat. No. 917,919 and Belgian Pat. No. 596,094.

More recently, it has been discovered that incorporation of the above combinations as dispersions in a continuous phase, e.g., gelatin, in which such combinations are substantially insoluble, results in photographic compositions of superior speed, sensitivity and other properties, including, with certain reactants, the ready ability to yield positive mode pictures. This discovery has been described in out applications Ser. Nos. 278,050 and 481,759, noted above.

SUMMARY OF THE INVENTION

It has now been found that photosystems as described above can be intensified and processes of such intensification form a part of our invention. Thus our invention is concerned with a process in which a developable latent image is formed upon exposure of image-yielding photosensitive material and the improvement whereby a subnormal level of exposure can be used.

In accordance with one aspect of our invention, we provide a composition comprising the combination of an image-yielding material and at least a sensitizing amount of a material that upon exposure to electromagnetic first radiation confers on the composition, in areas of such exposure, increased sensitivity to radiation in a spectral region of otherwise lower sensitivity. Prior to initial exposure, the sensitized composition is differently sensitive to different regions of the spectrum and the difference is large enough so that exposure of the composition to radiation in a region of lower sensitivity is insufficient to cause an objectionable amount of fogging. However, after being irradiated by even low levels of exposure, the sensitizer imparts to the areas so exposed an increased sensitivity to at least one of such lower sensitivity regions of the spectrum. The result is that a film can be exposed to subnormal levels of exposure and the latent image thereby formed can be intensified by blanket exposing the film to otherwise relatively ineffective radiation. Areas of the film that are not initially exposed are relatively less sensitive to the blanketing radiation. Thus, only the initially imaged areas are intensified by the blanket exposure. The result is an appreciable and significant increase in the effective speed of the film.

In a preferred embodiment, the sensitizer is present in combination with a photoinitiator which may, but need not be, one of the normal constituents of the image-yielding material. In another embodiment, an organic photosystem is utilized and it has been found that the speed of such photosystems are increased to such an extent that films of organic photosensitive materials can be substituted, in many uses, for silver halide films. In another aspect, our invention is concerned with the use of certain sensitizers to confer at least improved latensification properties on photosensitive material. In particular, our invention contemplates combining with photosensitive material at least a sensitizing amount of an optical sensitizing dye, in dye or dye base form, to confer photosensitivity to relatively low levels of light. Preferably, particularly with silver halide as a photosensitive material, the sensitizer is in the dye base form.

In all of the above embodiments and aspects, our invention provides a distinct improvement and step forward in the photochemistry art by providing a method whereby levels of exposure can be used that are normally too low to form a developable latent image in the absence of the latensification step or in the absence of combination with the sensitizer.

In the above-summarizing description of the invention, the term "image" is used to refer to both color and noncolor images. Thus, in one sense, the term includes images which in their developed form are discernible to the eye as a result of color formation in an initially light-struck area. However, the term is also being used to include images which, even in their developed state, are not necessarily discernible to the eye but which are defined by a useful change in physical or chemical properties, such as photographic sensitivity, solubility, wettability, optical turbidity, hardness, surface smoothness, and the like. The image can comprise a desensitization, which may be colorless, of otherwise photosensitive material in light-struck areas so that, on still further treatment Thus, in yet another aspect and with reference to compositions allowing desensitization of imaged areas upon blanket intensification, our invention is concerned with a process in which the intensified and partially desensitized composition is further exposed to radiation which yields a color in nondesensitized areas to obtain a positive mode reproduction of the image.

DESCRIPTION OF THE PREFERRED EMBODIMENTS

Figures 1, 2, 3:
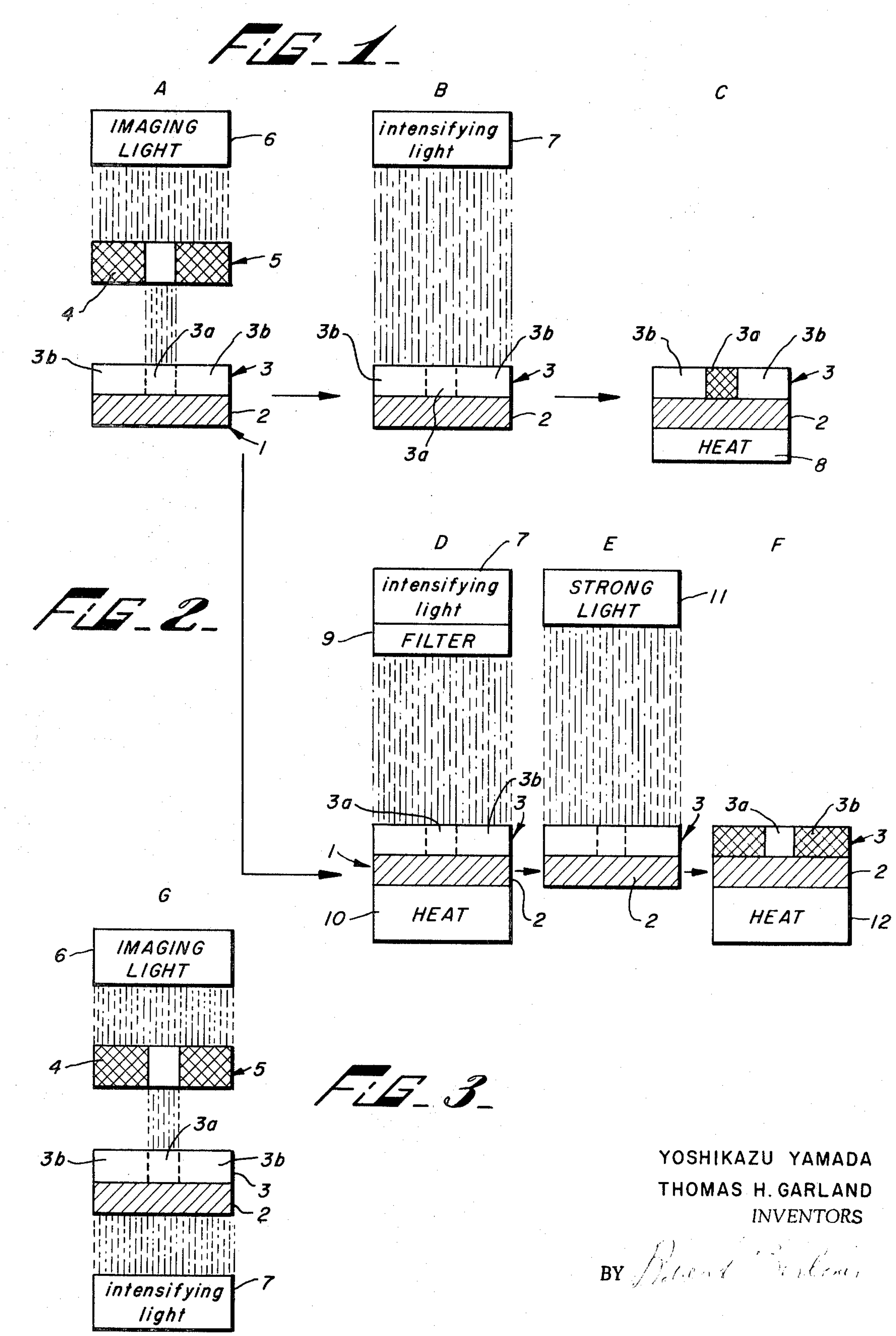
FIG. 1 is an essentially diagrammatic view showing a photographic sequence of a particular negative-working embodiment of the invention.
FIG. 2 is an essentially diagrammatic view of a photographic sequence of a particular positive-working embodiment of the invention.
FIG. 3 is an essentially diagrammatic view showing a photographic arrangement which may be used in either a positive- or negative-working embodiment of the invention.

Referring to FIG. 1, a photographic sequence is indicated generally by the three stations designated A, B and C, which represent a sequence for a negative-working system of the invention. In the first step A, a photosensitive element 1 of the invention is provided with a paper backing 2 and a photosensitive film or layer 3 which is subjected to an "imagewise" exposure by being exposed to the projection of an image 4 of a transparency 5, which may be a color transparency, with such image 4 being projected by a conventional source 6 of visible actinic light, which in this particular instance is a tungsten lamp (indicated diagrammatically). Exposure is for a short duration relative to the normal requirements of the film.

The photosensitive film can comprise a material that is substantially photoinsensitive to the level of the "imagewise" exposure, but the film is rendered photosensitive to such levels of exposure by preincorporating a sensitizer in accordance with our invention. A photosensitive material that can be conveniently used is a dispersion of N-vinylcarbazole and carbon tetrabromide in gelatin. Such formulations, among others, are described in detail in our above-noted application Ser. No. 481,759. As a sensitizer, one can use the dye base, 4-(p-dimenthylaminostyrl)-quinoline. Combinations of this dye base and the above dispersion of N-vinylcarbazole and carbon tetrabromide in gelatin, as well as other dye- and dye-base-organic photochemistry systems, are described in detail in our applications Ser. Nos. 352,625 and 523,705, also noted above. The sensitizer confers photosensitivity to the otherwise subnormal level of exposure so that upon such exposure at least an intensifiable latent image is formed. Such latent image is intensifiable by radiation that otherwise has no substantial effect on the photosensitive material. The latensifying radiation, in this case, is obtained from a light source 7 at station B, discussed further below.

The actinic light from the source 6 is absorbed by the image 4 but otherwise passes through the transparency 5 so as to impose a latent image on the photosensitive layer 3. The area **3*a* thus exposed on the photosensitive layer 3 is referred to as a "light-struck" area. The areas 3*b* (behind the image 4) are referred to as "nonlight-struck" areas. The nonlight-struck areas 3*b*** indicated at station A are, of course, not exposed to such actinic light.

Next, a station B, the previously exposed photographic film or layer 3 is subjected to a blanket or "nonimage" exposure to latensifying radiation from a second light source 7, which in this case is red light, e.g., obtained by passing light from light source 6 through a suitable red filter such as a Corning red-passing CS2–61 filter (which has a cut wavelength of from 6,100 to 6,190° A.), or by other means, indicated diagrammatically in FIG. 1 by numeral 7. The previously exposed or light-struck image area **3*a* as well as the previously unexposed or nonlight-struck image areas 3*b* are thus both exposed to latensifying light, but the latensifying light source 7 does not have a significant photoreactive affect on the nonlight-struck areas 3*b*, at least compared to its effect on the light-struck area 3*a*; that is, the latensifying light source 7 is "actinic" with respect to the light-struck area 3*a*, but relatively "nonactinic" with respect to nonlight-struck areas 3*b*. There is at least a substantial enough differentiation to allow the eventual development of an image in photographic element 1 representative of the image 4**.

Next, at station C, the latensified photographic film is developed by application of a heat source 8 to the paper side 2 of the film whereby color develops in "light-struck" area **3*a*, but no color, or relatively little color, develops in "nonlight-struck" area 3*b***. Of course, heat may be applied e.g., a completely different source such as an infrared source or, noted N-vinylcarbazole, the case of (e.g., photosensitive materials, heat may be omitted, i.e., with printout paper, or development may be obtained by chemical or other well-known means.

Referring now to FIG. 2, ans also to station A of FIG. 1, a photographic sequence is indicated generally by stations A, D, E, and F, which represent a sequence for a positive-working system of the invention. Such a sequence is particularly suitable for use with photosensitive materials that can undergo either a color-yielding or a noncolor-yielding reaction, e.g., the combination of an N-vinyl compound, such as the specifically noted N-vinylcarbazole, and organic halogen (e.g., carbon tetrabromide), particularly in the environment of a nonsolubilizing continuous phase, such as gelatin.

The first step A is exactly the same as above-described for the negative-working system. At station D the film is treated in a manner very similar to the treatment of the film at station B of FIG. 1, that is, the previously exposed photographic film or layer 3 is subjected to a blanket or "nonimage" exposure to latensifying radiation from a red light source 7. However, in this mode of the invention the intensity of the light from the source 7 is significantly decreased in comparison to the intensity of light source 7 as used in the negative mode described above. Such a decrease in intensity can be accomplished by placing an additional neutral- or red-light-absorbing filter 9 between the light source 7 and photosensitive element 1. Filter 9 transmits a decreased portion of the light from source 7 which is insufficient to yield color in accordance with the negative mode of FIG. 1 but is sufficient, with the particular composition used in this embodiment, to cause those areas which were initially light struck, i.e., areas 3*a*, to become desensitized against color formation upon subsequent light exposure.

Positive-working modes, similar (Note the above but without the benefit of light intensification, are described in our earlier noted applications. Especially in the environment of a nonsolubilizing continuous phase, the combination of organic halogen compound and N-vinyl compound is apparently capable of undergoing two separate and distinct reactions upon exposure to "actinic" light. (Note that the intensifying light is "actinic" with respect to initially light-struck areas 3*a* but is not "actinic" with respect to noninitially light-struck areas 3*b*). Thus, it is thought that in the initially light-struck areas 3*a*, there is combination between at least two reactions. In one reaction, in a negative-working mode is described above with respect to FIG. 1, colored material is formed. In another reaction, one that apparently takes place in this positive-working mode, "colorless" polymer is thought to be formed, which desensitizes such areas to subsequent color formation. The two reactions, i.e., negative working and positive working, are apparently competitive, the kinetics of which say that one or the other will predominate depending on the intensity of light, exposure time and/or wavelength of light, with the "colorless" polymer-forming reaction occuring with "-weaker" light, i.e., lower levels of light wherein intensity is less and/or wavelengths are longer and/or exposure times are shorter. In this case the "weaker" light is the filtered (or double-filtered) red light of increased intensity.

Heat can be applied at station D, as indicated by the numeral 10, simultaneously with intensification, or subsequent thereto, so as to hasten the desensitizing reaction.

Next, at station E, the exposed photographic film 3 is subjected to blanket exposure to relatively strong radiation in a region of original sensitivity of the photosensitive composition (i.e., radiation which causes color formation, at least upon heating, even in the absence of red light intensification). Such radiation is sufficiently intense, or is of such wavelength and/or exposure time, as to cause heat-developable latent image formation in those areas which were not desensitized at stations A–D. A relatively strong visible light source 11 can be used, or one can use a short blanket exposure with the imaging light source 6 of station A followed by blanket latensification with relatively "strong" red light as in station B of FIG. 1.

Next, at station F, the photographic film is developed by application of a heat source 12 to the paper side 2 of the film whereby color develops in those areas which were not initially struck by imaging light, but no color, or relatively little color, develops in the imaging-light-struck areas 3*a*. As noted with reference to station C of FIG. 1, other sources of heat and/or other development methods may be used.

Referring now to FIG. 3, another photographic arrangement is shown at station G which may be used as part of either a negative- or positive-working mode of the invention. Arrangement G may be used in place of the sequence of stations A and B in FIG. 1 in the case of the negative-working mode, or in place of the sequence of stations A and D of FIGS. 1 and 2 in the case of the positive-working mode. As shown in FIG. 3, the photosensitive film or layer 3 is subjected to imagewise exposure by projection of imaging light from light source 6 through image 4 of a transparency 5, in the same manner as at the imaging exposure station A. Concurrent with such exposure, or shortly thereafter, latensifying red light from source 7 is projected onto film 3 through paper base 2. In a negative-working mode, paper base 2 is thin enough, and/or latensifying light from source 7 is intense enough, so that a color-yielding capability is intensified. Subsequent treatment as in station C yields a negative mode image. On the other hand, if paper base 2 is significantly red light absorbing and/or the latensifying red light from source 7 is of sufficiently diminished intensity, latensification at station G would be similar to that occurring at station D, i.e., desensitization will occur in the initially light-struck areas. In this mode a subsequent heat step may be used to accelerate the reactions and the film subjected to the procedures of stations E and F to yield a positive mode image.

In general, any photographic system, organic or inorganic which in its basic form is not uniformly panchromatic, but which is capable of having its spectral sensitivity extended or selectively increased, can be improved by our process. Our process imparts an intensification propensity to a photographic composition containing an image-yielding material by the incorporation of small amounts of a sensitizer which may or may not extend initial spectral sensitivity but which upon initial exposure does extend sensitivity to a region of the spectrum to which the composition was previously (i.e., in the absence of the sensitizer) relatively insensitive. In referring to an image-yielding material, we intend to include not only materials which contain color-forming ingredients but also those which yield a color upon subsequent external treatment, e.g., by washing with a coloring agent or by printing with the material or otherwise using it as a master, or by other methods.

Thus, silver halide photographic systems, including develop-out, printout and direct-writing systems can be improved by our process. The following example will illustrate our process as applied to silver halide film.

EXAMPLE 1

Kodak Fine Grain Positive Film was bathed for 2 minutes in test solution. Test solution A was made up of 85 volume percent methanol and 15 volume percent water and contained $5.0\times10^{15}$ moles of 4-(p-dimethylaminostryl)-quinoline as a sensitizer. Test solution B was the same as solution A but additionally contained $5.0\times10^{15}$ moles of carbon tetrabromide as a photoinitiator. The film was dried at room temperature for 16 hours.

The film was exposed first to a white light exposure and the latensified with exposure to red light (same white light but filtered by a Wratten No. 92 Filter). The white light exposure was for 0.2 seconds in a contact printer having a 25-watt incandescent lamp. Four different red light exposures, progressing by factors of the square root of two, were given to successive films. These exposures were 10, 14, 20 and 28 seconds, respectively, using the contact printer with the red filter inserted. Both exposures were through a step-wedge, roughly square in shape, having 10 steps which change in transmission by a factor of two from one step to the next. In addition, a strip of opaque tape was added to the low transmission end, giving an additional step of zero transmission.

After the white light exposure, but before exposure to the red light, the wedge was rotated through a right angle, giving the possibility of 121 data points per sample (only a selection of these data points are reflected in the results shown below; other sets gave essentially similar results).

After the exposures, the samples were developed in D–19 Kodak processing solution for 2 minutes at 70° F., followed by conventional fixation and washing. Drying was in the open at room temperature. Densities were read on the transmission unit of a Densichron densitometer.

On any sample, a row of densities may be read which corresponds to a constant ratio (2X) of white light exposure intensities from one density to the next. The red exposure intensity is constant for that row (because the wedge had been rotated between first and second exposures), but vary by a factor of two from one row to the next. Hence, on any sample, we may read densities and plot D-log E (white light) curves for selected constant red light intensities. This was done for a red light intensity obtained by exposure through a wedge density of 0.61. Speed measurements were made on these D-log E curves by finding on each the exposure point which gave a density 0.1 above gross fog. When E is measured in meter-candle-seconds, American Standard PH 2.5–1960 defines the speed as 0.8/E at the 0.1 density point. In these experiments absolute meter-candle-seconds were not measured but the performance of the experimental samples was compared with that of a control film with a constant light source and exposure time. If the log-E speed point of the sample is subtracted from that of the control, a "log speed change" is obtained, and taking the antilog the relative ASA photographic speed is obtained.

The table below presents the results of speed measurements from the D-log E curves. In addition to the bathed samples a control sample was given the same double exposure and used as a base for determining the relative speed of the bathed samples. Further, a portion of a film sheet bathed in solution B was used as a "blank" by exposing the portion only to the white light but not to the red light. No significant increase in speed was obtained with the "blank." The results are given below.

Table 1

| Solution | Red Light Exposure (sec.) | Relative Speed |
|---|---|---|
| Control | ... | 1.00 |
| | 10 | 1.07 |
| | 14 | 1.15 |
| | 20 | 1.15 |
| | 28 | 1.18 |
| A | 10 | 2.00 |
| | 14 | 2.19 |
| | 20 | 3.02 |
| | 28 | 1.82 |
| B | ... | 1.02 |
| | 10 | 1.51 |
| | 14 | 1.66 |
| | 20 | 1.91 |
| | 28 | 2.63 |

The application of our process to other silver halide papers and to other photographic systems will now be readily appreciated. Silver halide films of different kinds are well known to the art and reference can be made to the Focal Encyclopedia of Photography, 1958 (The MacMillan Company, New York) for exemplary illustrations of various silver halide materials that can be benefited by our process. With regard to photographic systems not employing silver halide, reference can be made to Light-Sensitive Systems: Chemistry and Application of Nonsilver Halide Photographic Processes by Jaromir Kosar (John Wiley & Sons, Inc., New York). The disclosures of the Focal Encyclopedia and the Kosar reference are hereby incorporated by reference. Other methods for incorporating the sensitizing agents and/or photoinitiator may be used, as will be illustrated below with respect to other photosystems. Thus, the sensitizing materials may be incorporated in the emulsion during manufacture thereof.

It will be seen from the data in table 1 that in some cases the sensitizer alone yields better performance than in combination with a photoinitiator, but opposite results are also obtained. In general, with most photosystems, it is preferred to use a photoinitiator in conjunction with the sensitizer.

As a sensitizer, one can use any material that upon an initial exposure sensitizes the composition to which it is added to radiation in a region of the spectrum to which it has otherwise low sensitivity. Preferably, the sensitizer itself absorbs radiation in a region of the spectrum used for the imaging exposure and, at least in conjunction with the photosensitive composition, responds to such exposure to intensify, extend, or shift, its absorption in or into a region of the spectrum to which the unexposed composition (including the sensitizer) has relatively low sensitivity. Thus, it is preferred to use as the sensitizer a material which has selective light absorptivity, which absorptivity is shiftable, extensable or, in part, intensifiable, as described. In general, it is preferred that such materials have the optical properties of, or be, optical sensitizing dyes or dye bases.

Reference can be made to our earlier application Ser. No. 523,705 and to a 1957 publication of Brooker and Vittum entitled "A Century of Progress in the Synthesis of Dyes for Photography" in The Journal of Photographic Science, Volume 5, 1957, pp 71–88, the disclosure of such publication being incorporated herein by reference. All of these dyes tend to absorb actinic energy and all have exhibited their ability to transmit the absorbed energy by a physical molecular contact or by engagement to other molecules receptive of actinic energy for purposes of photoresponse. Illustrative materials are: compounds having a characteristic rhodamine ring structure and nominal substitution at an amino group, such as the rhodamines (i.e., aminophthaleins); materials having simple (unsubstituted) carbon chains interconnecting fused heterocyclic and benzenoid ring structures, such as pinacyanole and related carbocyanine- or cyanine-type dyes or dye bases; light absorbers containing heterocyclic rings fused with benzenoid rings, such as eosin dyes; and light absorbers having a triphenylmethane structure, including leuco forms thereof and compounds having thiazine, alizarine, acridine and anthraquinonoid groups or structures. In general, light absorbers having a styryl substituent such as the styryl and azastyryl dies and dye bases are particularly useful in our invention and comprise a particularly preferred group of sensitizers. In general, it is preferred to use an optical dye or dye base. It is particularly preferred to use a dye base, such as the styryl dye bases and vinyl homologs thereof, especially where a photoinitiator, as described below, it is not additionally provided. Examples of the use of various of the above-noted light absorbers will be found below.

Although various dyes have been described as sensitizers for our process, the ability of such dyes to form a color is not important to the process except insofar as related to an ability to selectively absorb and/or transfer electromagnetic radiation. Thus, a sensitizing amount of the sensitizer is used rather than a color-forming amount, which amounts may be different. This is in sharp contrast to certain prior systems, as noted above, where dyes are used in relatively high concentration for their color-forming function. A similarly high concentration of sensitizer would not itself serve a useful purpose, although a sensitizing function may still be obtained. In some cases only sensitizer amounts are useful, e.g., where the color formed with high concentrations of dye or dye base will interfere with the color of the image, or the dye or dye base will function more as an optical filter than as a sensitizer. Suitable concentration ranges depend, of course, on the sensitizer and photosystem. In general, about 0.001 to about 100 mg. of sensitizer per gram of image-yielding material is satisfactory.

Optionally, but preferably, a photoinitiator may be present. Such initiators are compounds which produce free radicals or ions upon exposure to light of a suitable wavelength, such as the haloalkanes, halomethylnapthalenes, $\alpha$-haloketones, halogenated acids, sulfonyl chlorides and aroyl peroxides. Such of these materials as are discussed by McCloskey and Bond in Industrial Engineering Chemistry, Volume 47, page 2,125 et seq. (1955) are of interest here, and such disclosure is incorporated herein by reference. Other materials include aromatic hydrocarbon photoinitiators such as found in U.S. Pat. No. 2,902,421, substituted benzoins described in U.S. Pat. No. 2,722,512, metal mercaptides as described in U.S. Pat. No. 2,738,319, benzene thiols as described in U.S. Pat. No. 2,861,934, ethylenic compounds as described in U.S. Pat. No. 2,716,633 and thiuram monosulfides as described in U.S. Pat. No. 2,861,933, the disclosures of the above patents being incorporated herein by reference.

In general, it is preferred, where a photoinitiator is used, that such be an organic halogen compound as these have been found to be the most effective. Such compounds are described in detail in our earlier filed application Ser. No. 481,759. In general, organic halogen compounds are preferred in which there is present at least one active halogen selected from the group consisting of chlorine, bromine and iodine, attached to a carbon atom having not more than one hydrogen atom attached thereto. Examples of such compounds can be found in our noted earlier application and also in certain patents issued to Eugene Wainer and Robert Sprague such as U.S. Pat. Nos. 3,042,515, 3,042,516, 3,042,517, 3,042,518, 3,042,519, 3,046,125, 3,056,673, and 3,082,086, the disclosures of such patents being incorporated herein by reference.

In a particular embodiment of this invention, it is preferred to use as an initiator an organic halogen compound having the formula $$Br\text{-}C\text{-}(X)\,(X')\,(X'')_n(CY_3)_{1-n}$$

where X, X′ and X″ are halogens, each Y is independently selected from the group consisting of halogen, hydrogen, hydroxy, methyl and methylol, and "*n*" is selected from 0 and 1, such that when "*n*" is 0, X and X′ are Br. These compounds are generally more compatible and more effective with optical dye sensitizers selected from the dye and dye base form, particularly the styryl dyes and dye bases, and are preferred in such combination. Examples of such compounds and combinations can be found below and in the above-noted patents to Wainer and Sprague and prior applications.

A suitable concentration of photoinitiator depends on the particular photosystem and sensitizer. As noted, use of a photoinitiator in conjunction with the sensitizer is preferred but optional, e.g., with silver halide as a photosystem. In such systems, therefore, the amount of photoinitiator ranges from 0 to an amount that interferes with the functioning of the basic system. In general, however a concentration of the magnitude of the sensitizer is satisfactory, i.e., from about 0.0001 to about 100 mg. of photoinitiator per gram of image-yielding material. In other photosystems, a photoinitiator may be present as a part thereof, e.g., the N-vinylcarbazole-carbon tetrabromide system described with regard to FIGS. 1–3. In such systems it is not usually necessary to add additional photoinitiator for the sensitizer as the amount already present is usually sufficient. In such cases a weight ratio of image-yielding material to photoinitiator of from about 1:5 to about 50:1 is satisfactory. Accordingly, with reference to photosystems in general, the amount of photoinitiator can satisfactorily range from about 0.001 mg. to about 5 grams per gram of image-yielding material.

The processes of this invention are particularly suitable to the intensification of organic photosensitive materials and systems, and examples of such materials and systems can be found in the referenced Kosar publication. In a particularly preferred embodiment, the photosystem contains an aromatic amine to yield an image and systems containing such compound, particularly in conjunction with a photoinitiator, are described in the referenced Wainer and Sprague patents. Our process is particularly adaptable to photosystems comprising a combination of aromatic amine, notably heterocyclic nitrogen containing compounds such as N-vinylcarbazole, and organic halogen compound.

EXAMPLE 2

An image-yielding organic photosensitive material was prepared by combining 1 ml. of a 50 percent benzene solution of N-vinylcarbazole (as image former) with 2 ml. of a 30 percent benzene solution of carbon tetrabromide (as photoinitiator) in 1 ml. of a 20 percent benzene solution of polystyrene (as binder). Six drops of a 1 percent benzene solution of 4-(p-dimethylaminostyryl)-quinoline (as sensitizer) was added to the formulation and the formulation was coated on white vinylite to approximately 1 mil wet thickness. The formulation was exposed for 5 seconds to a transparency image with white light from a 300-watt Bell & Howell Headliner Projector at 41 inches. A portion of the sensitized formulation was covered and the vinylite sheet was blanket exposed to red light for 10 seconds. Exposure was with the Bell & Howell Headliner Projector at the same distance as before but with a Corning CS2–59 red-passing filter placed in front of the projector lens (the filter was cut wavelength of from 6,280 to 6,370 A.).

The formulations were blanket exposed with a Sylvania "Sun Gun 11" (Model SG–55) for 0.3 seconds and then heated with a heat gun (rated at 14 amps for 115 volts and delivering 3,000 feet per minute of air at 500°–750° F.) at about 30 inches for about 1 minute. A positive mode image developed in the portion of the sensitized formulation that was exposed to red light but not in the unexposed portion or in the unsensitized formulation.

In a further embodiment of this invention, the image-yielding material is particulate, that is in the form of particles. Preferably, the material is dispersed in a substantially nonsolubilizing continuous phase, which is generally water penetrable. Such dispersions are particularly well suited for intensification in accordance with our processes. Generally, the solid-film-forming component used to achieve the continuous phase may be any of a number of generally photographically inert materials, which are, in most cases, soluble in water or so finely dispersible therein in the concentrations of use that for practical purposes there is no distinction between solution and dispersion for these materials in the continuous phase. Such materials include the starch and starch derivatives, proteins (i.e., casein, zein, gelatin, thiolated gelatin, etc.), alginates, gums, and the like materials which are generally considered to be natural derivatives of natural film-forming materials, any one of which in its conventional "water-soluble" form is used in film benefited by the instant invention. In addition, synthetic water-soluble film formers are particularly suitable binders for photosystems benefited by this invention and such materials include polyvinyl alcohol, commercially available water-soluble polyacrylics or acrylates (i.e., water-soluble polyacrylic acid salts have substantially the molecular weight and water compatibility of the polyvinyl alcohol), various commercially available amine or amine-aldehyde resins, etc. Also, a number of cellulose derivative film formers may be used, and these include the various water-soluble cellulose ethers, carboxymethylcellulose, hydroxypropylmethylcellulose, etc. Essentially these materials have photoinsensitive and their principle function is that of forming the desired film to retain the dispersed phase in discrete particle form. Of the above materials, gelatin, casein, polyvinyl alcohol, gum arabic, starch, alkali metal carboxymethylcellulose (e.g., sodium carboxymethylcellulose) and hydroxyethylcellulose are particularly useful in this invention.

Use of the above-described type of nonsolubilizing continuous phase as support for organic photochemical materials yields particularly good results with our processes and are particularly preferred where an aromatic amine is used as an image-yielding material, particularly in conjunction with an organic halogen compound. Such photosystems are described in detail in our earlier applications, as noted above, particularly in application Ser. No. 481,759 and the disclosure in Ser. No. 481,759 as well as that in Ser. No. 352,625 and No. 523,705 are incorporated herein.

As noted, in a particularly preferred embodiment, the photosystem comprises a dispersion of an aromatic amine with an organic halogen in a nonsolubilizing continuous phase. It is further preferred that the aromatic amine be an N-vinyl compound. In the environment of the nonsolubilizing continuous phase the combination of organic halogen and N-vinyl compound is capable of undergoing two separate and distinct reactions upon exposure to actinic light to yield either a negative mode or positive mode image, as described above relative to FIGS. 1*a* and 2*d*, *e* and *f*. Further illustrations will be found below.

EXAMPLE 3

Baryta paper was coated to about 3 mil wet thickness with an emulsion having the following formulation

| | |
|---|---|
| 20% Gelatin | 50 ml. |
| 37% Formalin | drops |
| 5% Chrome Alum | 5 drops |
| 1.5% Tergitol 4 | 10 drops |
| N-vinylcarbazole | 4.0 g. |
| carbon tetrabromide | 3.2 g. |
| 4-(p-dimethylaminostyryl)-quinoline | 2 mg. |
| In ethyl acetate | 2 ml. |

The formalin and chrome alum are used to harden the gelatin. The Tergitol 4 is a wetting agent. The coated and dried sheet was exposed to a Busch Pressman Camera for one one-hundredth second at f/4.7 to an outdoor scene under direct sunlight with an average intensity of about 9,000 foot-candles. The exposed sheet was flooded with "weak" red light, using a Corning CS2–61 red-passing filter in front of a 300 G Watt Bell & Howell Headliner Projector at 6 feet, for about 5 seconds. The sheet was then heated for about 10 seconds by passing it once through a rotating drum heater at 70° C. The sheet was then given a blanket exposure to the Sylvania "Sun Gun 11" at a distance of 15 inches for 1 second. Upon heating, as above, a good positive print was obtained.

In contrast, sheets coated with the same formulation and exposed under the same conditions in a Busch Pressman Camera at *f*/4.7 require from 2 to 3 seconds of such exposure to yield comparable positive images without latensification.

EXAMPLE 4

A sheet was coated and exposed as in example 3. The exposed sheet was then flooded with "strong" red light using the same red light as in example 3 for 5 seconds but at 2½ feet. The sheet was then heated for about 10 seconds on the rotating drum heater at 70° C. to bring out a good negative image.

In contrast sheets coated with the same formulation and exposed under the same conditions in a Busch Pressman Camera at *f*/4.7 do not yield comparable negative images without latensification and yield only very weak negative images after 20 or more seconds of exposure.

EXAMPLE 5

A sheet was coated with the formulation of example 3 except that 6.4 grams of bromotrichloromethane was substituted for the 3.2 grams of carbon tetrabromide. The coated sheet was given a 2-second initial exposure to the Sylvania "Sun Gun 11" at 14 inches through a step wedge as described in example 1. The step wedge was turned as in example 1 and the sheet was latensified for 10 seconds with the sun gun through a Corning CS2–59 red-passing filter. The sheet was then flooded for 1 second with the sun gun, without the step wedge or filter and then heated for about 30 seconds with a rotating drum heated at 70° C. A positive mode checkerboard effect was obtained demonstrating latensification. (In the absence of latensification, only a series of darker-to-lighter bars are obtained.)

EXAMPLE 6

Baryta paper was coated to about 3 mil wet thickness with the following formulation:

| | |
|---|---|
| 20% Gelatin | 50 ml. |
| 37% Formalin | 2 drops |
| 5% Chrome Alum | 5 drops |
| 1.5% Tergitol 4 | 10 drops |
| N vinylcarbazole | 4.0 g. |
| carbon tetrabromide | 3.2 g. |
| 9-(p-dimethylaminostyryl)acridine (9SA) | 3 mg. |
| In tetrahydrofuran | 2 ml. |

After drying, test strips were exposed for 0.2 seconds to a Kodachrome projection from 34 inches using a 300-watt Bell & Howell Headliner Projector. One exposed test strip was latensified for 5–10 seconds with tungsten light filtered through a Corning CS2–61 red-passing filter at about 3 feet using the 300-watt Bell & Howell Headliner Projector. Another exposed test strip was not latensified. Both strips were heated for about 10 seconds with a rotating drum heater at about 70° C. Both strips were then flooded with the Sylvania "Sun Gun 11" for 1 second at about 14 inches and then heated again by passing through the rotating drum heater.

The test strip that was not latensified was completely black, whereas, the latensified test strip showed a good positive image.

EXAMPLE 7

Test amounts of 4-[4-(p-dimethylaminopheny)1,3-butadienyl]pyridine were prepared by refluxing 9.3 grams of 4-picoline and 17.5 grams of p-dimethylaminocinnamaldehyde with 5 ml. HCL for about 20 hours at 125° C. The mixture was dissolved in 500 ml. hot methanol and cooled, yielding a precipitate. The precipitate was filtered and dissolved in hot methanol which was made alkaline with triethylamine to yield 4-[4-(p-dimethylaminophenyl)-1,3-butadienyl]pyridine, which was filtered and dried and found to have a melting point of 252°–260° C.

A formulation was prepared as in example 6 except that the above-prepared dye base 4-[4-(p-dimethylaminophenyl)1,3-butadienyl]pyridine was substituted for the 9SA used in example 6. The formulation was coated, exposed and treated in the same manner as in example 6 to yield a good positive image. A similarly prepared and exposed test strip, but which was not latensified, showed no image.

EXAMPLE 8

Test amounts of 4-(p-dimethylaminostyryl)-pyridine were prepared by refluxing 18.6 g. of 4-picoline and 30 g. of p-dimethylaminobenzaldehyde in 15 ml. of acetic anhydride for about 6 hours. The mixture was allowed to cool and was then poured into aqueous sodium hydroxide (about 16 g. dissolved in 50 ml. of water) and stirred, After excess acetic anhydride had been hydrolyzed, solid 4-(p-dimethylaminostyryl)-pyridine was filtered, recystallized from methanol and found to have a melting point of 244°–250° C.

A formulation was prepared as in example 6 except that 2 mg. of the above-prepared 4-(p-dimethylaminostyryl)-pyridine was substituted for the 3 mg. of 9SA used in example 6. A test strip was coated, exposed and latensified as in example 6 to yield a good positive image. A similarly prepared test strip that was exposed but not latensified did not yield an image.

EXAMPLE 9

Formulations were prepared as in example 6 except that, in place of the 3 mg. of 9SA in 2 ml. of tetrahydrofuran, the following sensitizers, in 2 ml. of ethyl acetate, were used: Leuco Malachite Green (2mg.); Ethyl Red (2 mg.); Rhodamine B (1 mg.); 2-(p-dimethylaminostyryl)benzothiazole (3 mg.); and 2-(p-dimethylaminostyryl)-benzoxazole (3 mg.). In each case test strips coated 3 mil wet thickness with the above formulations, and dried, were exposed for 0.6 seconds to a Kodachrome transparency image with a 300-watt Bell & Howell Headliner Projector at 34 inches. One test strip of each formulation was latensified for 5–10 seconds with tungsten light from the projector through a Corning CS2–61 red-passing filter at about 34 inches. Another test strip of each formulation was not latensified. The test strips were passed for about 24 seconds through a rotating drum heater at 74° C. They were then flooded with the Sylvania "Sun Gun 11" for 1 second at about 14 inches and passed again through the rotating drum heater. Those test strips that were latensified gave good positive images. The test strips that were not latensified gave not images.

EXAMPLE 10

Baryta paper was coated with a formulation prepared as in example 3 except that 9-(p-diamethylaminophenyl)-acridine was used in place of 4-(p-deimethylaminostyryl)-quinoline. Coated sheets were exposed for 1 second to a Kodachrome transparency with a 300-watt Bell & Howell Headliner Projector at 34 inches. One sheet was latensified for 1 second with tungsten light from the projector through a Corning CS2-61 red-passing filter at about 34 inches. Another sheet was not latensified. The sheets were processed in a manner similar to that in example 9. The latensified sheet showed a good positive image whereas the sheet that was not latensified showed no image.

The addition of a sensitizer may broaden the spectral response of the image-yielding material so that the combination is additionally sensitive in a region to which the image-yielding material was not originally sensitive. However, this is not necessary to the success of our process, but it is important that subsequent to initial exposure the combination has an extended or increased spectral response to a region of the spectrum to which the unexposed combination (containing the sensitizer) has relatively low sensitivity. This region of increased or extended sensitivity need not correspond with any region of spectral absorption of the sensitizer itself as there may be an intimate association of the sensitizer with the photosensitive material and/or the photoinitiator, if any, to alter the spectral absorption of the individual reagents.

Initial exposure should be to a region of the spectrum to which the sensitized system responds by modifications of its spectral sensitivity to additional exposure. For the materials illustrated above, at least a portion of this region falls within the visible spectrum, particularly within the blue region. Combinations may also be formulated in which initial exposure would be in another spectral region. However, for economic and convenience reasons, it is preferred that the initial exposure take place in some visible region of the spectrum, preferably in the blue portion thereof. There may also be more than one intensification region; i.e., upon initial exposure sensitivity may be extended into more than one spectral region and/or the original sensitivity of more than one spectral region may be intensified. However, to be useful in our process, there must be enough difference in sensitivity between initially exposed and unexposed areas of the film in at least some spectral region to allow subsequent latensification without inordinate or objectionable fogging. For example, the formulation of example 3 can be initially exposed to blue light and then latensified with either blue or red light. However, since the combination is initially sensitive to blue light, latensification with such light may result in a fogged image. Since the combination is not significantly initially sensitive to red light, latensification with such light yields a good image. The following examples illustrate the use of various regions of the spectrum for imaging or latensifying.

EXAMPLE 11

Baryta paper was coated to about 3 mil wet thickness with an emulsion having the formulation of example 3. The coated and dried sheet was exposed in a Busch Pressman Camera fitted with a Corning CS5-60 blue-passing filter (having about 65 percent transmission at about 4,200 A.). Exposure was to an outdoor scene as in example 3, but for one twenty-fifth second at *f*/5.6. Following this initial exposure, the film was latensified by exposure for 11 seconds to a 300-watt Bell & Howell Headliner Projector at 34 inches through a Corning CS2-61 red-passing filter. The film was heated for about 10 seconds with a rotating drum heated at about 70° C., flashed with the Sylvania "Sun Gun 11" at 14 inches for 1 second, and then heated to yield a good positive image. When paper coated with the same formulation was imagewise exposed in a similar manner through a Corning CS2-61 red-passing filter, image was not obtained even after 60 seconds of red light latensification.

EXAMPLE 12

A strip of baryta paper coated with the formulation of example 7 was exposed for 60 seconds in a spectrograph equipped with a Bausch & Lomb Microscope Lamp 31-33-53, as a tungsten light source. The strip was heated for about 5 seconds on a rotating drum heater at about 70° C. The strip was then flooded with the Sylvania "Sun Gun 11" for 0.5 seconds at about 14 inches and then heated again by passing through the rotating drum member for about 10 seconds. A positive mode image was obtained which was essentially a bright spot at about 5,950-6,000 A. and tapering from about 5,500 to about 6,500 A.

The above experiment was repeated except that, subsequent exposure by the spectrograph and prior to heating, the strip was latensified for 5 seconds with light from a 300-watt Bell and Howell Headliner Projector, at 34 inches filtered through superimposed Corning CS3-69 (having a cut wavelength of from 5,130 to 5,270 A.) and CS4-70 (maximum transmission of 86 percent at 4,620 A. and 15 percent transmission at about 6,5050 A.) filters, the combination passing green light. After heating, exposure to the "Sun Gun" and reheating, as above, a positive mode image was obtained with the bright spot extending from about 5,300 to about 6,300 A. and tapered from about 3,800 to about 6,800 A. with an additional, but less intense, image spot at from about 7,100 to 7,800 A., demonstrating effective latensification with green light.

It is not intended to relay on any particular theory of operation, and, indeed, the mechanism of operation of the various sensitizers is not readily verifiable. However, it does appear that in many cases upon initial exposure of the sensitized composition a somewhat transient condition is induced during which a propensity for latensification appears. In some cases this propensity exists only momentarily, in others it exists for long periods of time. This can be illustrated by the following example.

EXAMPLE 13

Baryta paper was coated to about 3 mil wet thickness with the formulation of example 3. After drying, three exposures were made with a Busch Pressman Camera to an outdoor scene, as in example 3, but for one twenty-fifth second at *f*/4.7. Processing involved flooding the exposed sheet with tungsten light from a 300-watt Bell and & Howell Headliner Projector at about 84 inches through a Corning CS2-61 red-passing filter for approximately 30 seconds, then exposing the sheet to about 30 seconds of flooding from the projector at the same distance, without a filter. The sheets were then heated for 24 seconds with a rotating drum heater at about 74° C.

One exposed sheet was processed immediately. Another exposed sheet was processed after waiting 15 minutes. A control exposure of one twenty-fifth second was made, with the camera, at the end of the 15-minute period, and processed immediately. The third exposed sheet was processed after waiting for 1 hour and 40 minutes. Again, a control, exposed in the camera at one twenty-fifth second, was made at that time.

All the exposures that were processed immediately gave good positive images. The exposure that was processed after 15 minutes of waiting time gave a somewhat degraded positive image. There was essentially no image obtained with the exposure that was processed an hour and 40 minutes after taking.

It will be appreciated from the foregoing that our process enables one to expose with very low levels of light. Indeed, the demonstrated ability to obtain an image, negative or positive, with an organic photosensitive system using ordinary photographic methods is unprecedented. Very low exposure times and/or light levels can be used to expose the paper but the optimum time depends, of course, on the particular photosystem and sensitizer. With preferred materials daylight exposures, at say *f*/5.6, of as low as one one-hundredths of a second or even shorter can yield satisfactory results. Other materials may require longer exposure times or higher levels of light, but still are improved relative to corresponding but nonlatensified materials.

The length of latensification exposure time and/or level of latensification exposure also depends on the particular photosystem and sensitizer; in general, the stronger the latensifying light the less time needed for latensification. However, in some processes, e.g., where a negative or positive mode can be obtained, one cannot simply trade off intensity for exposure time but rather threshold factors are involved. Thus, with the photosystem of example 3, a threshold of latensification may be required to obtain a negative image, i.e., below a certain level of latensification only a positive image will be obtained regardless of length of time of the latensification exposure. Details of such threshholds can be found in our above-noted earlier applications.

In general, the amount of latensification in terms of usable energy therefrom is comparable to the amount of imaging light that would be required in a region of normal sensitivity for the photographic material (i.e., without latensification), and this, of course, varies with each material. Generally, the intensity of the latensification light can be adjusted so that latensification conveniently takes place in from about 1 second to about 1 minute.

In some cases, following initial exposure, a particular sensitizer may impart sensitivity only to radiation in a region to which the original material is highly sensitive, and thus latensification is somewhat masked by fogging. In other cases the imparted sensitivity, although into a relatively nonfogging region, is not of sufficient intensity to effect an entirely satisfactory latensification. In these cases it has been found helpful to modify the structure of dye so as to extend and/or intensify its ability to latensify. With particular reference to optical sensitizing dyes and dye bases having at least one ring as part of a conjugation system it has been found that the addition of an electron density influencing group to an appropriate position the ring can effect sufficient extension and/or intensification of the latensification properties of the dye or dye base so as to allow its satisfactory use in our processes.

In general, the position of such substitution depends on whether the substituent is electron donating or withdrawing. In the case of electron-donating groups it is preferred to add these to a position in the ring ortho or para to a heterocyclic atom or major functional group; in the case of electron-withdrawing atoms or groups, it is preferred to add these to the meta position. However, there are exceptions to these general preferences. For example, some atoms, e.g., the halogens, exhibit both electron-withdrawing and electron-donating properties. Such atoms have approximately equal electron-donating and withdrawing effects with the elctron-withdrawing effect becoming increasingly more important as one goes down the Periodic Group from fluorine to iodine. Further, some substituents increase the latensification ability of a sensitizer regardless of the position of the ring to which they were added; this effect is particularly notable with regard to electron-withdrawing groups.

Accordingly, the exact nature of the substituent and position on which it is placed is not susceptible of ready prediction. However, it is merely important to note that optical sensitizers can often be noticeably and dramatically improved by the addition of such a group.

A variety of nuclear substituted dye precursors are available for condensation reactions for the synthesis of dyes and dye bases. Examples of such precursors containing electron-donating groups include: 6-aminolepidine, 8-aminolepidine, 3-aminoquinaldine, 4-aminoquinaldine, 8-aminoquinaldine, 6-methoxylepidine, 8-amino-6-methoxylepidine, 6-dimethylaminoquinaldine, 6-dimethylaminolepidine, 6-ethoxylepidine, 3-methoxyquinaldine, 6-methoxyquinaldine, 8-methoxyquinaldine, 2-ethyllepidine, 3-ethyllepidine, 6-methylquinaldine and the like. Examples of dye and dye base precursors containing electron-withdrawing groups include: 5-nitroquinaldine, 6-nitroquinaldine, 7-nitroquinaldine, 8-nitroquinaldine, 4-nitroquinaldine, 3-nitroquinaldine, 6-trifluoromethylquinaldine, 3-nitrolepidine, 5-nitrolepidine, 6-nitrolepidine, 8-nitrolepidine, 6-trifluoromethyllepidine, and the like. Examples of precursors having a group exhibiting both electron-donating and withdrawing properties include: 2-chlorolepidine, 2-bromolepidine, 4-bromoquinaldine, 6-bromoquinaldine, 8-bromolepidine, 8-chloroquinaldine and the like.

Methods of preparing the foregoing sensitizers, including the foregoing dyes and dye bases as well as the foregoing precursors used in preparing dyes and dye bases, are well known to the art. The precursors are generally commercially available but they can also be readily and simply prepared by well-known methods. Examples of the preparation of dyes and dye bases from such precursors can be found in the application filed concurrently herewith by P. Bruck and N. G. Adin, entitled "IMPROVED SENSITIZERS." Use of such improved sensitizers to latensify can be illustrated by the following example.

EXAMPLE 14

Test amounts of 2-(p-dimethylaminostryl)-4-chloroquinoline were prepared by heating 17.8 grams of 4-chloroquinaldine and 14.9 grams of p-dimethylamino-benzaldehyde with 5 ml. of hydrochloric acid at hot water bath temperature for 20 hours. A solid mass formed which has ground under sodium hydroxide solution, extracted into benzene and chromatographed on acidic alumina. Unchanged aldehyde and quinoldine were removed by elution with benezene. Subsequent elution with ether yielded 2-(p-dimethylaminostyryl)-4-chloroquinoline as yellow needles. The dye base was crystallized from methanol to yield chunk prisms having a melting point of 129°–130° C.

The formulation was prepared and coated on a baryta sheet as in example 6 except that 3 mg. of the above-prepared 2-(p-dimethylaminostryl)-4-chloroquinoline (4-chloro-2SQ) in 2 ml. of ethyl acetate was substituted for the 3 mg. of 9SA in tetrahydrofuran used in example 6. Another baryta sheet was coated with a similar formulation but one in which 3 mg. of 2-(p-dimethylaminostyryl)-quinoline (2SQ) in 2 ml. of ethyl acetate was substituted for the 9SA in tetrahydrofuran. Test strips of each formulation were exposed for 0.2 and 0.3 seconds to a Kodachrome projection from 34 inches using a 300-watt Bell & Howell Headliner Projector. One-half of each test strip was covered and the strips were then exposed for 60 seconds to latensifying tungsten light filtered through a Corning CS2–59 red-passing filter at about 3 feet using the Bell & Howell projector. The coverings were removed and the strips were flooded with the Sylvania "Sun Gun 11" for one-half second at about 14 inches and then heated by passing through a rotating drum heater at about 70° C. for about 10 seconds. Both test strips that were exposed for 0.3 seconds showed an image in the latensified portion and no image in the covered portion; the image obtained with the formulation containing 4-chloro-2SQ was of substantially better contrast. The test strip that was exposed for 0.2 seconds and contained 4-chloro-2SQ showed an image in the latensified portion and not in the covered portion. The test strip that was exposed for 0.2 seconds and contained 2SQ did not show an image in either the latensified or covered portions.

As previously noted, the image-yielding material may contain color-forming ingredients or it can be material which yields a color upon external treatment. The following example illustrates such external treatment.

EXAMPLE 15

Baryta paper was coated to about 3 mil wet thickness with an emulsion having the following formulation:

| | |
|---|---|
| 20% Gelatin | 50 ml. |
| 37% Formalin | 2 drops |
| 5% Chrome Alum | 5 drops |
| 1.5% Tergitol 4 | 10 drops |
| N-vinylcarbazole | 4.0 g. |
| 1,1,1-tribromo-2-methyl-2-propanol | 3.2 g. |
| **4-(p-dimethylaminostyryl)-quinoline** in ethyl acetate | 3 mg. 2 ml. |

The coated sheet was given a 10-second imagewise exposure to a 300-watt Bell & Howell Headliner Projector at 24 inches. It was latensified for 10 seconds with the projector light through a Corning CS2–59 red-passing filter and then soaked for 5 minutes in a 5 percent aqueous solution of sodium hydrosulfite. A similar sheet was likewise exposed and treated with sodium hydrosulfite but without latensification. Both sheets were dried in the dark. A good red-colored negative image was obtained on the latensified sheet but essentially no image was obtained on the nonlatensified sheet.

In place of the sodium hydrosulfite treatment, the latensified image can be brought out by reticulating imaged areas, after latensification and heating, by washing the sheet with solvent, such as 50/50 mixture of acetone and water, and then rubbing with a soft pencil, depositing carbon in the reticulated areas.

It will be understood that modifications and variations may be effected without departing from the scope of the novel concepts of our invention.

We claim:

1. In a photographic process in which a photosensitive composition is imagewise exposed, an image is formed therein and color is developed in either the imagewise-exposed areas or nonimagewise-exposed areas of said composition, said composition including a photoinitiator component which produces free radicals or ions upon exposure to light or a suitable wavelength, the improvement comprising the steps, prior to complete color development, of:

incorporating in said composition a sensitizing amount of photographic spectral sensitizing dye or dye base compound having a ring structure and which enables an image to be developed in said composition following exposure to actinic radiation normally insufficient to produce said image, said dye or dye base compound being different from other components of said composition;

determining a first spectral region of relatively low or no photosensitivity of said sensitized composition;

determining a second spectral region of high photosensitivity, relative to said first spectral region, of said sensitized composition;

determining a third spectral region of photosensitivity of portions of said sensitized composition which have been exposed to said second spectral region;

determining a coincident range of said first and third spectral regions;

imagewise exposing said sensitized composition with light of said second spectral region sufficiently to radiatively modify said composition to constitute a latent image; and blanket exposing said imagewise-exposed composition with light of said coincident range to further radiatively modify those portions of the composition constituting said latent image.

2. In a photographic process in which a photosensitive composition is imagewise exposed, an image is formed therein and color is developed in either the imagewise-exposed areas or nonimagewise-exposed areas of said composition, said composition including a photoinitiator component which produces free radicals or ions upon exposure to light of a suitable wavelength, the improvement comprising the steps, prior to complete color development, of:

incorporating in said composition a sensitizing amount of photographic spectral sensitizing dye or dye base compound having a ring structure and which enables an image to be developed in said composition following exposure to actinic radiation normally insufficient to produce said image, said dye or dye base compound being different from other components of said composition and being chosen so that said sensitized composition has (1) relatively low or no photosensitivity to light of a second spectral region, (2) high photosensitivity to light of a second spectral region, (3) photosensitivity to light of a third spectral region in portions of said sensitized composition which have been previously exposed to light of said second spectral region, and (4) a coincident range in said first and third spectral regions;

imagewise exposing said sensitized composition with light of said second spectral region sufficient to radiatively modify said composition to constitute a latent image; and blanket exposing said imagewise-exposed composition with light of said coincident range to further radiatively modify those portions of the composition constituting said latent image.

3. The process of claim 2 in which said spectral sensitizing compound is a dye in base form.

4. The process of claim 2 wherein said photosensitive composition is dispersed in particulate form in a binder therefore.

5. The process of claim 2 wherein said photosensitive composition comprises organic color-forming material.

6. The process of claim 2 wherein said photosensitive composition is dispersed in a binder in which the photosensitive components thereof are substantially insoluble.

7. The process of claim 2 wherein the imagewise exposure is at a level that is normally too low to form a developable latent image in said photosensitive composition in absence of said blanket exposure.

8. The process of claim 6 wherein the nonsolubilizing binder is water soluble.

9. The process of claim 3 wherein the spectral sensitizing compound is selected from styryl dye bases and vinyl homologs thereof.

10. The process of claim 9 wherein light of said second spectral region comprises visible light including substantial portions of wavelengths of from about 3,500 to about 5,500 A. and light of said coincident range includes substantial portions of wavelengths of from about 6,000 to about 7,200 A.

11. The process of claim 2 wherein the photoinitiator component comprises an organic halogen compound in which there is present at least one active halogen selected, selected from the group consisting of chlorine, bromine and iodine, attached to a carbon atom having not more than one hydrogen atom attached thereto.

12. The process of claim 2 wherein said photosensitive composition includes an aromatic amine as a color-forming component thereof.

13. The process of claim 2 wherein said photosensitive composition includes an N-vinyl compound as a color-forming component thereof.

14. A process which comprises:

imagewise exposing to visible light a composition comprising a dispersion, in a water-soluble continuous phase, of a combination obtained by combining (a) photoreactive proportions of N-vinylcarbazole and an organic halogen compound having the formula $BR\text{-}C\text{-}(X)(X')(X'')_n(CY_3)_{1-n}$ wherein X, X′ and X″ are halogens, each Y is independently selected from the group consisting of halogen, hydrogen, hydroxy, methyl and methylol, and "$n$" is selected from 0 and 1, such that when "$n$" is 0, X and X′ are Br, with (b) an optical sensitizing dye in base form selected from styryl dye bases and vinyl homologs thereof, to induce at least a latent image therein, and intensifying the latent image with electromagnetic radiation including substantial portions of wavelengths of from about 6,000 to about 7,200 A.

15. The process of claim 20 in which said N-vinyl compound is capable of yielding color and noncolor areas in respective responsive to high and low levels of exposure and wherein said blanket exposure is chosen to be at a level insufficient to substantially yield a color, but sufficient to deactivate imagewise-exposed areas against color formation, and said composition is sequentially further blanket exposed to radiation in the region of original sensitivity of the composition with light of said second spectral region at a wavelength or level sufficient to yield color in areas exclusively of said imagewise-exposed areas, thereby effecting a positive-working photographic process.

UNITED STATES PATENT OFFICE
CERTIFICATE OF CORRECTION

Patent No. 3,607,266 Dated September 21, 1971

Inventor(s) Yoshikazu Yamada et al.

It is certified that error appears in the above-identified patent and that said Letters Patent are hereby corrected as shown below:

Column 2, line 49, "out" should read -- our --. Column 3, line 43, after "treatment," insert -- color is formed in non-image-light-struck areas. --. Column 4, line 60, after "2" change "ans" to -- and --. Column 5, line 14, "(Note" should read -- to --; line 25, "combination" should read -- competition --; line 26, "is" should read -- as --; line 39, "increased" should read -- decreased --. Column 6, line 45, "the" should read -- then --. Column 9, line 32, after "O" insert -- up --. Column 10, line 5, "was" should read -- has a --; line 37, "have" should read -- having --; line 43, "have" should read -- are --. Column 11, line 2, before "drops" insert -- 2 --; line 16, after "300" cancel "G". Column 13, line 69, "heated" should read -- heater --. Column 14, line 20, "6,5050" should read -- 6,050 --. Column 16, line 31, "The" should read -- A --. Column 17, line 73, before "(3)" insert -- relative to its photosensitivity to said first spectral region --. Column 18, line 52, "${}_3)_{11n}$" should read -- ${}_3)_{1-n}$ --; line 72, "exclusively" should read -- exclusive --.

Signed and sealed this 10th day of October 1972.

(SEAL)
Attest:

EDWARD M.FLETCHER,JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,607,266 Dated September 21, 1971

Inventor(s) Yoshikazu Yamada and Thomas H. Garland

It is certified that error appears in the above-identified patent and that said Letters Patent are hereby corrected as shown below:

Col. 17, line 71, "to light of a second" should read --to light of a first--.

Col. 18, line 63, "15. The process of claim 20" should read --15. The process of claim 13--.

Signed and sealed this 28th day of January 1975.

(SEAL)
Attest:

McCOY M. GIBSON JR.
Attesting Officer

C. MARSHALL DANN
Commissioner of Patents